United States Patent [19]

Anderson et al.

[11] Patent Number: 5,030,052
[45] Date of Patent: Jul. 9, 1991

[54] TIES FOR BUILDING STRUCTURES

[75] Inventors: Alan T. Anderson; Gordon W. Fraser, both of Liverpool, United Kingdom

[73] Assignee: Clan Contracting Limited, Liverpool, United Kingdom

[21] Appl. No.: 438,458

[22] PCT Filed: Jun. 23, 1988

[86] PCT No.: PCT/GB88/00499
§ 371 Date: Feb. 20, 1990
§ 102(e) Date: Feb. 20, 1990

[87] PCT Pub. No.: WO88/10349
PCT Pub. Date: Dec. 29, 1988

[30] Foreign Application Priority Data
Jun. 24, 1987 [GB] United Kingdom ............... 8714775

[51] Int. Cl.$^5$ ............................................. F16B 35/02
[52] U.S. Cl. .................................. 411/383; 411/412; 52/704
[58] Field of Search ............. 411/383, 384, 386, 392, 411/412, 413, 178; 52/704, 713, 714

[56] References Cited

U.S. PATENT DOCUMENTS 1,207,391 12/1916 Frauenheim ........................ 411/397
4,854,797 8/1989 Gourd ................................. 411/392

FOREIGN PATENT DOCUMENTS 292742 11/1988 European Pat. Off. ............ 411/386
2216522 10/1973 Fed. Rep. of Germany ........ 52/704
2187408 9/1987 United Kingdom ................ 411/413

Primary Examiner—Neill R. Wilson
Attorney, Agent, or Firm—Pravel, Gambrell, Hewitt, Kimball & Krieger

[57] ABSTRACT

A tie bolt comprises a shank provided thereon with equally pitched screw-threaded portions (16, 18) separated by a spacer portion (14) capable of sliding through a hole created by the leading screw-threaded portion (16) so as to permit rapid screw-engagement of the trailing screw-threaded portion with said hole, characterized in that said threaded portions are provided by separate components (16, 18) arranged at a predetermined distance apart.

4 Claims, 1 Drawing Sheet

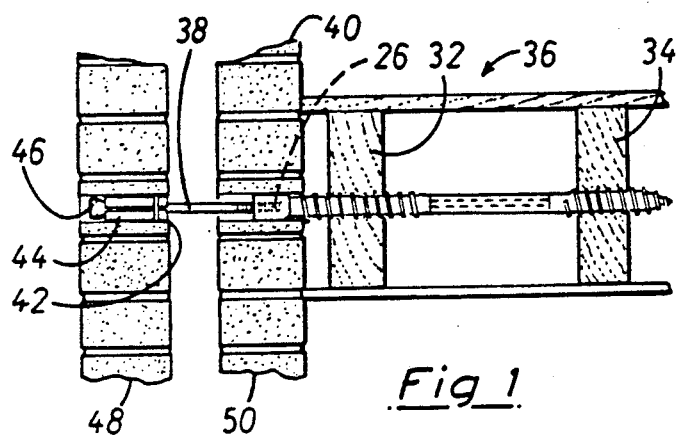
Fig_1
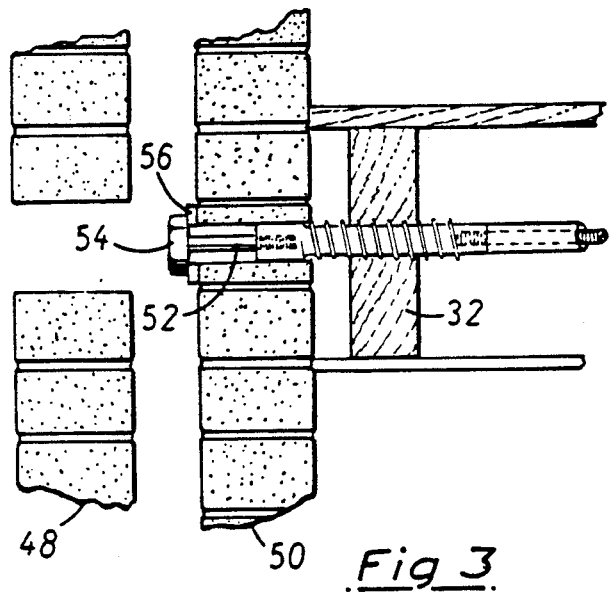
Fig_3
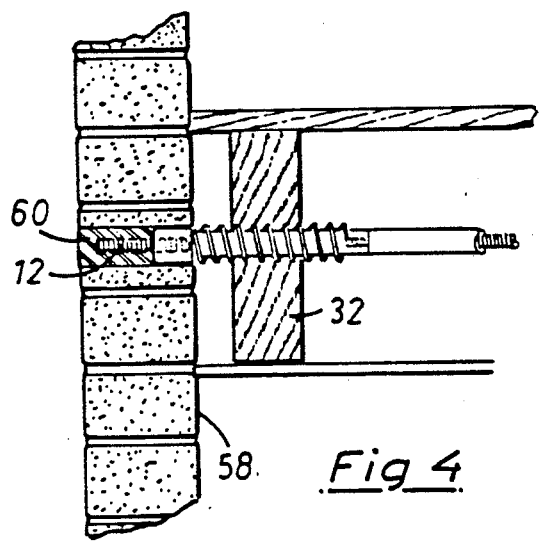
Fig_4
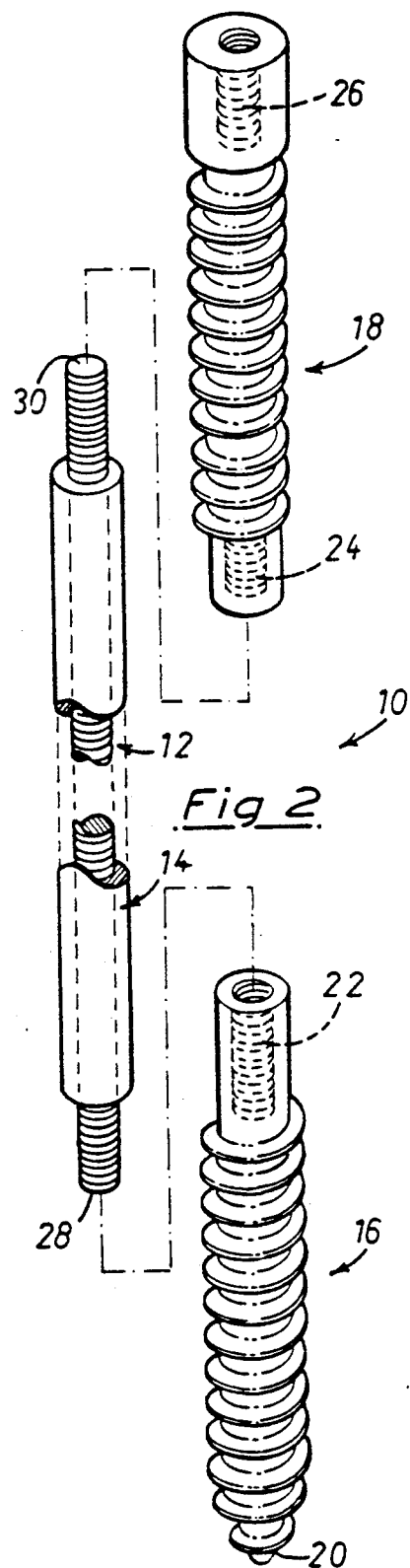
Fig_2

TIES FOR BUILDING STRUCTURES

The present invention relates to an improvement in ties for securing wall structures, such as a house wall to a wooden structure such as a floor or roof.

By way of example of the application of such ties, in older buildings it is often found that an exterior wall will tend to bulge outwardly. This is caused by a variety of factors such as wall tie corrosion, moisture expansion, wind loads etc. It is also a requirement of current building regulations in the United Kingdom to restrain wall structures at each floor level which forms a diaphragm. A conventional way of doing this is to attach metal brackets to the wall by means of masonry bolts and to attach the brackets to the wooden structure, that is to say to joists forming part of the wooden structure. This is an expensive and time-consuming operation requiring lifting of floor boards and, when there is a fitted cupboard or sanitary suite adjacent to the wall, these have to be dismantled before the floor boards can be lifted.

In U.K. Patent No. GB 2130327B there is described a tie bolt for use in securing a wall structure to a wooden structure incorporating joists without having to gain direct access to that wooden structure, the tie bolt having a shank which is provided thereon with equally pitched screw-threaded portions which are spaced apart by an intervening unthreaded portion and which are adapted to be screwed into two substantially parallel spaced apart wooden joists, the tie bolt being adapted at its head to be secured in or to be clamped against a wall structure to support the wall structure relative to a structure of which the joists form a part.

One drawback with this tie is that the distance between joist centers is not standard on building structures and therefore ties of many different lengths need to be produced. Since the ties are machined and the shank of the tie is turned to enable a smooth running between joists, the ties can be weak around this central area as well as being expensive to produce.

An object of the present invention is to provide a tie bolt which can be made to the required size on site, which is strong and which can be used to secure a wall structure to a wooden structure incorporating joists without having to gain direct access to that wooden structure.

According to the present invention there is provided a tie bolt comprising a shank provided thereon with equally pitched screw-threaded portions separated by a spacer portion capable of sliding through a hole created by the leading screw-threaded portion so as to permit rapid screw-engagement of the trailing screw-threaded portion with said hole, characterized in that said threaded portions are provided by separate components arranged at a predetermined distance apart.

Preferably, said screw-threaded components are mounted on a common carrier rod which preferably also receives the spacer portion in the form of a separate sleeve or tube trapped between the screw-threaded components.

Preferably, the spacer tube when placed over the rod abuts the two screw-threaded components enabling the screw-threaded components to tighten onto the rod when they are secured, thereby providing the tie with more rigidity.

In order to insert a tie bolt according to the invention, it is simply necessary to cut the screw threaded rod and spacer to length and assemble the tie. A hole is then drilled through the wall structure of sufficiently large diameter for the tie bolt to pass through freely and it is then advantageous to drill a pilot hole through the two joists. The tie bolt can then be inserted through the wall structure from the outside and can be screwed into the joists without having to gain direct access to the joists from within the building.

When it is desired to secure the inner skin (in the case of a cavity wall) to the structure of which the joists form a part, such as a wooden floor, it is sufficient to provide suitable fastening means, e.g. a bolt and backing plate, on the tie bolt to engage the inner skin. Alternatively, a conventional type of expansion anchorage can be fitted to the shank of the tie bolt and can be tightened within the inner skin. To secure the outer skin to the structure of which the joists form a part, an extension rod can be attached to the tie bolt, the extension rod having at its outer end the usual type of expanding anchorage which can then be tightened within the bore of the outer skin.

In accordance with a further aspect of the present invention the head of the tie is suitably shaped to enable it to be fixed to a wall structure using a resin such as polyester or epoxy resin.

The invention is further described by way of example with reference to the accompanying drawings in which:

FIG. 1 is a sectional view of a tie bolt in accordance with the present invention used for securing the outer skin of a cavity wall to a floor structure;

FIG. 2 is an exploded large scale view of the components making up the tie according to the invention;

FIG. 3 is a part-section of the tie according to the invention showing the inner skin of a cavity wall secured to a floor structure by means of a bolt; and FIG. 4 is a part-section of a tie according to the present invention in which it is fixed using epoxy resin to a wall according to the second aspect of the invention.

Referring to the drawings, it can be seen that the tie bolt 10 according to the invention is made up of four components excluding the head which varies depending on the fixing means used to attach the tie to the wall. These components include a threaded rod 12, a spacer tube or sleeve 14, a threaded forward component 16 and a threaded rear component 18.

The rod 12 is made of a suitable e.g. 6 mm diameter threaded stainless steel rod and is cut to the required length as required. The spacer tube 14 fits closely over the rod 12. The spacer tube is made of stainless steel and is cut to length as required. The threaded component 16 has a pointed end 20 and at its opposite end a tapped bore 22. The rear threaded component 18 has a tapped bore 24 to receive the rod 12 at one end and a head receiving tapped bore 26 at the other end.

The rod 12 and the sleeve 14 are cut to the required length. The end 28 of the rod is then screwed into the tapped bore 22 of the component 16. The spacer tube 14 is then placed over the rod and the component 18 is screwed onto the end 30 of the rod. The appropriate head is fixed to the tapped bore 26 depending on the job to be carried out. The threaded portions 16 and 18 are so spaced apart by the rod 12 and spacer tube 14 as to be received respectively in two parallel wooden joists 32 and 34 forming part of a floor structure 36. Thus, the spacing between the threaded portions 16 and 18 has to be chosen to suit the pitch between the joists 32 and 34.

As shown in FIG. 1, an extension rod 38 is screwed into the blind bore 26, this extension rod being almost long enough to extend through a cavity wall structure 40 which is to be tied to the floor structure 36. Thus, the extension rod 38 is screw-threaded at one end to be received in the blind bore 26 and it is also screw-threaded at its outer end to receive a conventional expanding anchorage of the kind used for a wedge-type masonry bolt. Thus, a nut 42 is screwed first onto the outer end of the extension rod 38 to serve as an abutment, the wedge assembly 44 is placed over the screw-threaded outer end and finally a clamping cone 46 is threaded onto the end of the rod and tightened in order to clamp the wedge assembly to the outer skin 48 of the cavity wall 40.

It can be seen it is merely necessary to drill a hole through the outer and inner skins 48 and 50 of the cavity wall structure 40 for the tie bolt to pass through freely and of an appropriate diameter for the wedge assembly 42, 44, 46 and, when the joist 32 is reached, a smaller hole is drilled through the joists 32 and 34 to act as a pilot for the tie bolt 10. A suitable head for the engagement of a tool, such as a spanner or brace, is temporarily screwed on the outer end of the extension rod 38 to enable the tie bolt to be screwed home. Thereafter, the temporary extension head is removed and the wedge structure 42, 44, 46 is screwed on and tightened. Thus, it can be seen the wall structure 40, or at least its outer skin 48, has been firmly secured to the floor structure 36 without having to gain access to the floor structure itself other than to ascertain the positions of the joists and without having to remove any bricks. Cursory examination of the floor structure is all that is necessary to ascertain the locations of the joists, since these will be revealed by the nail heads by which the floorboards are secured to the joists.

One way in which a tie bolt according to the invention can be used to secure the inner skin 50 to the floor is shown in FIG. 3. As shown in FIG. 3, a brick is preferably removed temporarily from the outer skin 48 and a hole is drilled through the inner skin and a pilot hole through the joists 32 and 34 (not shown). A bolt 52 is screwed into the blind bore 26 in the tie bolt 10 and the tie bolt can be screwed home using the hexagonal head 54 of the bolt 52. Preferably, a backing plate 56 is located between the head 54 and the inner skin 50.

Another way in which a tie bolt according to the invention can be used is to secure a solid or concrete wall structure 58 to the floor as shown in FIG. 4. A hole is drilled through the wall 58 and a pilot hole is drilled through the joists 32 and 34 (not shown). A suitable attachment, in this case a piece of rod 12 is screwed into the blind bore 26 in the tie bolt 10 after it has been screwed home. The tie bolt's head is then fixed in the wall 58 using an epoxy resin or a polyester resin 60.

While the tie bolt according to the present invention has been described in its use for securing house walls to the floors they can equally well be used for clamping walls and parapets to flat roof structures.

By having two spaced apart equally pitched threaded portions 16 and 18, each of little more than sufficient length to pass through the thickness of the joists, it is only necessary to screw the portion 18 through the joist 32 and then the bolt can be pushed in freely and rapidly until the threaded portions 16 and 18 engage the respective joists 32 and 34.

For the sake of clarity, the tie bolts 10 have not been drawn to scale in FIGS. 1 and 2. In practice, the diameter of the tie bolts will be much smaller in relation to the dimensions of the bricks of which the wall 40 is built.

We claim:

1. A tie bolt comprising a shank provided thereon with equally pitched leading and trailing screw-threaded portions separated by a spacer portion capable of sliding through a hole formed by the leading screw-threaded portion so as to permit rapid screw-engagement of the trailing screw-threaded portion with said hole, characterized in that said threaded portions are provided by separate components arranged at a predetermined distance apart and mounted on a common carrier rod, wherein the spacer portion is provided by a separate component in the form of a sleeve mounted on the rod and trapped between the screw-threaded components.

2. A tie bolt as claimed in claim 1, characterised in that the components are in screw-threaded engagement with the rod.

3. A tie bolt as claimed in claim 1 characterised in that the leading end of the leading screw-threaded component terminates in a point and the trailing end of the trailing screw-threaded component is connected to fastening means for fixing the tie bolt to a wall.

* * * * *